Oct. 4, 1966     J. W. SCOTT ETAL     3,276,120
SURGICAL KNIVES
Filed April 17, 1964
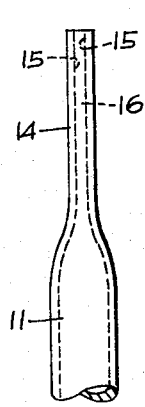
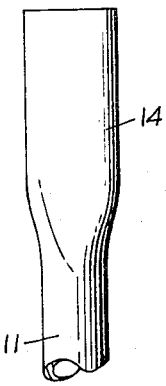
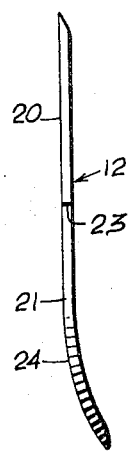
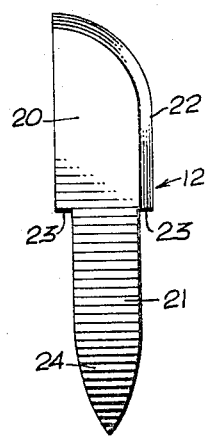
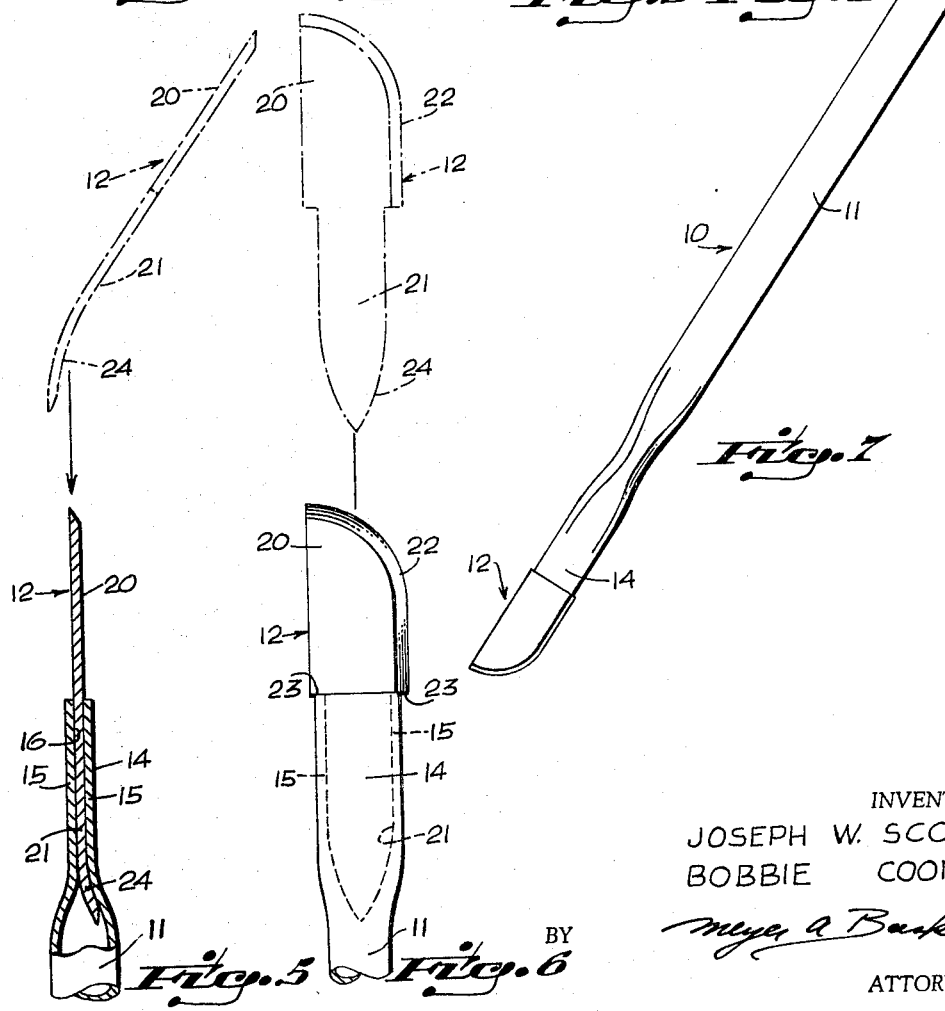
INVENTORS
JOSEPH W. SCOTT
BOBBIE COONS
BY *Meyer A. Baskin*
ATTORNEY

United States Patent Office 3,276,120
Patented Oct. 4, 1966

3,276,120
SURGICAL KNIVES
Joseph W. Scott, 10885 SW. 82nd Ave., Miami, Fla., and Bobbie Coons, 440 W. 16th St., Hialeah, Fla.
Filed Apr. 17, 1964, Ser. No. 360,530
2 Claims. (Cl. 30—342)

This invention relates to improvements in scalpels or surgical knives and more particularly to a novel and improved arrangement of handle and interchangeable blades therefor.

The present invention relates to the structure, manufacture and assembly of a surgical knife with a tubular handle and interchangeable blades. The handle, having a one piece holding portion and a forward open end, encloses a generally constant, cross sectional, hollow area along the entire length of the holding portion. The holding portion is reformed by rolling, pressing or otherwise to provide the holding portion with a particular configuration. The holding portion is sized and shaped to receive the shank of the blade in order to restrict movement perpendicular to the main axis of the handle. The rearward end of the holding portion has an outwardly projecting inner surface for holding the blade against forward movement in the direction of the main axis. The blade has a shank portion and a cutting portion, the shank portion is bent so that the distal end of the shank portion will move into the outwardly projecting inner surface to hold the blade. The bent portion is made of a material having springback, so that the shank portion may easily pass through the forward end of the holding portion and also grip the outwardly projecting inner surface.

The principal object of this invention is to provide a surgical scalpel or knife blade which may readily be removed from its carrying handle and quickly replaced by the surgeon with another blade without the use of tools or fastening devices of any kind.

A further object of this invention is to provide a device of this character which will be formed of a minimum of parts which are durable throughout extended use of the device, require no adjustment at any time and permit extreme speed, ease, and sure action in replacing one blade for another in one simple manual motion.

Another object is the provision of a universal size, shape and configuration to the relation between the mounting shank of all blades, regardless of the size, shape and configuration of the cutting portion of the blade, and the holding tool or handle.

Still another object of the novel combination of parts of this invention is to provide a device requiring but simple single pulling motion to remove one blade and a like simple single pushing-motion to insert another blade which device positively retains the blade in immovable fixed operating position without the use of accessory locking devices.

Other objects and advantages will appear from a reading of the following detailed description in connection with the following drawings in which:

FIGURE 1 is an enlarged edge view of the blade receiving end of the handle of the scalpel of this invention, FIGURE 2 is an enlarged side view of the blade receiving end of the scalpel illustrated in FIGURE 1, FIGURE 3 is an enlarged edge view of one of the scalpel blades subject of this invention, FIGURE 4 is an enlarged side view of the scalpel blade illustrated in FIGURE 3, FIGURE 5 is an enlarged cross-sectional view of the blade receiving end of the scalpel illustrated in FIGURE 1, showing a scalpel blade inserted completely therein as it would be mounted in operative position, the blade also being shown in broken lines above the scalpel illustrating its position relative thereto just before insertion into the scalpel, FIGURE 6 is an enlarged side view of the scalpel and blade mounted in operative position, with the blade also shown in pre-inserted position, similar to FIGURE 5, and FIGURE 7 is a side view of the complete scalpel handle and blade united in operative position the size being approximately normal.

Referring now to the drawing in more detail, in which like numerals are used to designate like parts throughout the several views, the numeral 10 designates the scalpel generally which has an elongated handle 11 and a removable scalpel blade mounted therein in operative position. The blade is indicated in general by the numeral 12. (See FIGURE 7.)

Handle 11 may be of any configuration, length, weight or size, the one illustrated in FIGURE 7, being for purposes of general illustration only. Preferably, handle 11 is made of stainless steel and hollow throughout to prove light weight. Any other material may be used.

In this invention the hollow blade holding end is flattened out by rolling, pressing, casting or otherwise to provide a reduced end portion 14 having parallel side walls 15 as shown in FIGURES 1 and 5. It is important that the inner surfaces of side walls 15 be as nearly parallel as possible to provide a flat blade receiving slot 16, for the purpose to be hereinafter described. Side walls 15 also completely surround slot 16 on the narrowed edges as well as the wideflat sides.

The removable scalpel blade 12 of this invention is made of tempered high carbon steel and has a cutting blade portion 20 at its outer end and an integral shank portion 21 at its inner end. The shank portion 21 may be of less width than blade portion 20 forming shoulders 23 which may serve as limit stops in assembly as will be later described. The cutting blade portion 20 may have a very sharp cutting edge 22, as shown in the drawings, along one side edge. Other types of scalpel blades (not shown) may have sharp cutting edges on both side edges of the scalpel blade, they may be pointed, rounded or in any desired configuration, or may be offset or at an angle to integral shank portion as desired. The particular shape of the scalpel blade shown is for purposes of illustration only.

Referring now to FIGURES 3, 4 and 5 in particular, the shank portion 21 of scalpel blade 12, being of tempered high carbon steel, is curved or crimped, at the portion indicated by the numeral 24 during production, into a permanently curved spring set position and it will always tend to assume this curved position.

The slot 16 formed by the parallel wall 15 of the reduced end portion 14 of scalpel handle 11 is specifically arranged in size to closely receive shank portion 21 of scalpel blade 12 in a close tight slidable fit as shown particularly well in FIGURE 5. The thickness of spring steel curved shank portion 21 in relation to the width of slot 16 is such that the spring curved shank portion will be straightened out when inserted between the parallel walls 15 and be in snug contact therewith.

The novel arrangement of parts of this invention above described permits the insertion of the scalpel blade 12 in operative mounted position securely in operative mounted position and securely unites it with scalpel handle 10 in the following manner.

The surgeon simply grasps the flat sides of outer portion 20 of scalpel blade 12 firmly between his thumb and forefinger and inserts the curved shank end 21 into slot 16 of reduced end 14 of handle 11. The application of a medium amount of force applied in the direction indicated by the arrows in FIGURES 5 and 6 will move the shank 21 into contact with the extreme outer end of the handle with shoulders 23 abutting thereon. The tempered spring steel of which the curved shank 21 is made will permit the flexing of the spring into a flattened position as it is compressed between the parallel walls 15 which form slot 16. A locking gripping action will result which will hold the blade 12 in immovable operative position.

To change blades the surgeon has merely to reverse the operation and withdraw the blade in use and insert another.

This simplicity and speed of the interchanging operation is frequently of extreme importance in surgery. Different shapes sizes and configurations are often required. A scalpel may be accidentially dropped damaging the blade and a blade may be found which is not of required sharpness.

A most important feature of the construction of this invention to be noted is that slot 16 is completely surrounded by the parallel side walls 15 which are also parallel at the edges as clearly illustrated in FIGURE 6 and extend around and encircle slot 16. This feature assures perfect alignment and positioning of the blade 12 and prevents movement in any direction when positioned in slot 16. There is no possibility of tilting or other side movements.

All attempts at solving this problem in the prior art require mounting set screws and other ancillary fastening devices. Many employ hinges, clamping pins, locating holes and the like. This invention eliminates all of these fasteners requiring extra manipulation and adjustment. Valuable time is saved in the use of the herein disclosed novel arrangement. The simplicity of this invention reduces the cost of manufacture. It improves reliability by eliminating sources of failure and necessity for repair. This scalpel and interchangeable blade combination eases the problems of sterilization.

It is obvious that the novel blade and handle interchangeable mounting apparatus disclosed herein may be utilized for any tool requiring removable blades and is not limited to use as a surgeon's scalpel and such use is contemplated.

We claim:

1. A knife comprising a handle, a blade removably connected to said handle, said handle opening only in a blade entering direction at one of its ends and including a one-piece blade holding portion adjacent said opening, said blade holding portion having a substantially symmetrical inner surface enclosing a generally constant, hollow cross sectional area sized and shaped to provide a snug connection between said handle said blade adjacent said opening, said inner surface having opposite outwardly projecting walls extending away from said opening, said blade having a cutting portion and a stiffly flexible shank portion, said shank portion having a bend between said cutting portion and the distal end of said shank portion and an axial length allowing the distal end of said shank portion to engage either of one of said outwardly projecting walls for retarding a removing action of said blade, symmetricaly shaped shoulders on said shank portion extending outwardly from said shank portion past the limits of said area bounded by said inner surface adjacent said opening limiting the movement of said shank portion further into said blade holding portion.

2. A knife as set forth in claim 1, wherein the distal portion of said shank portion has converging edges shaped and sized for engaging said outwardly projecting inner surface.

References Cited by the Examiner

UNITED STATES PATENTS

| 1,176,248 | 3/1916 | Rottner et al. | 30—342 X |
| 1,636,062 | 7/1927 | Maclure | 30—342 X |
| 2,240,387 | 4/1941 | Crank et al. | 30—337 |
| 2,646,621 | 7/1953 | Catanese | 30—340 X |
| 2,951,290 | 9/1960 | O'Kain | 30—329 |

WILLIAM FELDMAN, *Primary Examiner.*

JAMES L. JONES, JR., *Assistant Examiner.*